Dec. 17, 1968  R. E. LOOKABAUGH  3,416,857
METHOD AND APPARATUS FOR EXAMINING VISUAL FIELDS INCORPORATING
OPTICAL LIGHT TARGET PROJECTION MEANS AND
TRANSPARENT OVERLAY RECORD CHART
Filed May 29, 1963  3 Sheets-Sheet 1
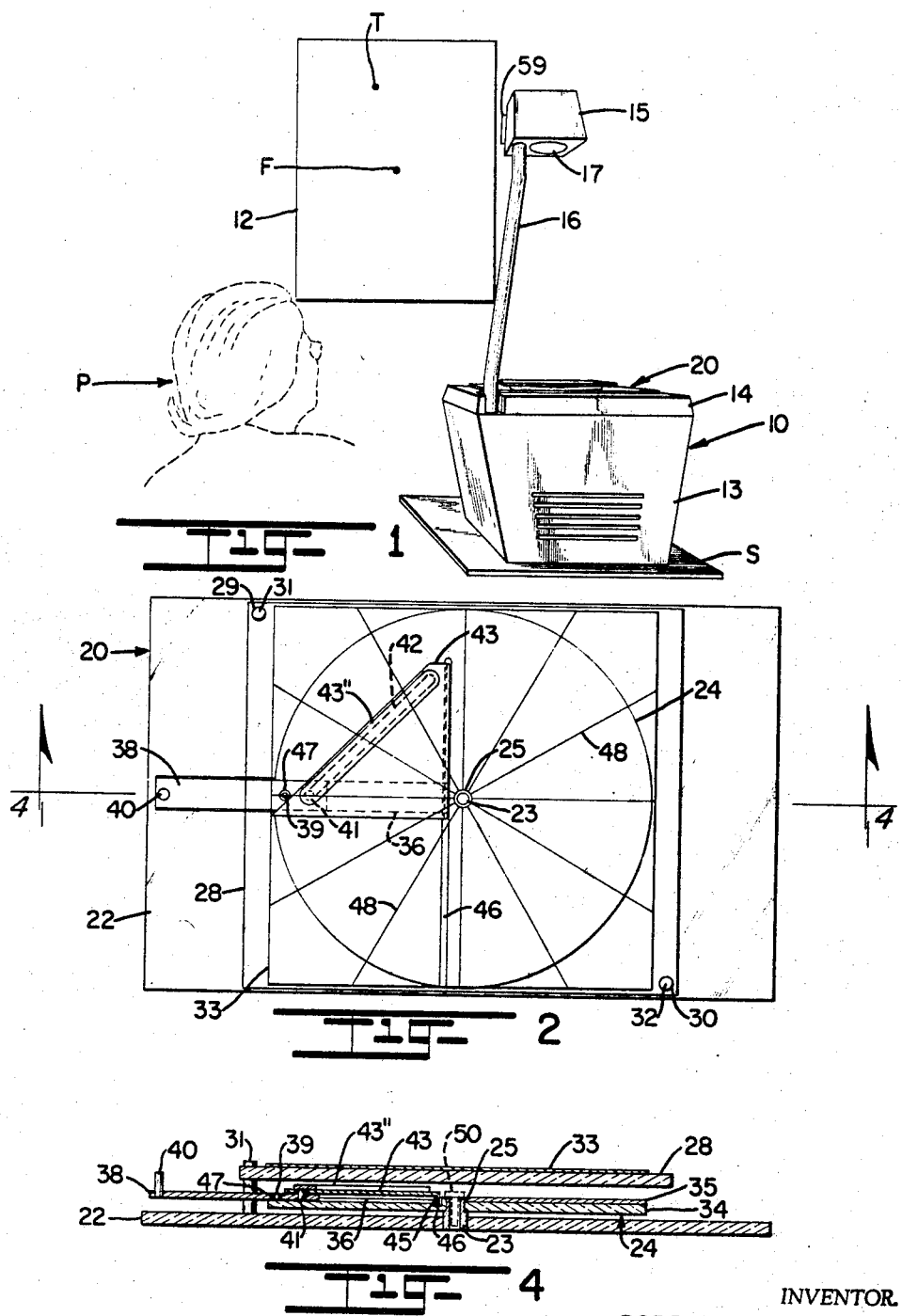
INVENTOR.
ROBERT E. LOOKABAUGH
BY
ATTORNEY Dec. 17, 1968    R. E. LOOKABAUGH    3,416,857
METHOD AND APPARATUS FOR EXAMINING VISUAL FIELDS INCORPORATING
OPTICAL LIGHT TARGET PROJECTION MEANS AND
TRANSPARENT OVERLAY RECORD CHART
Filed May 29, 1963    3 Sheets-Sheet 2

INVENTOR.
ROBERT E. LOOKABAUGH
BY
ATTORNEY

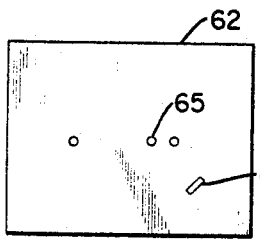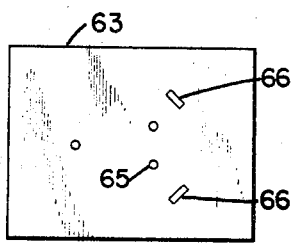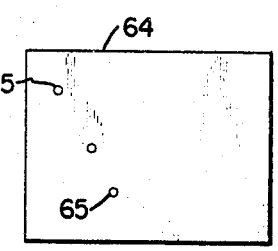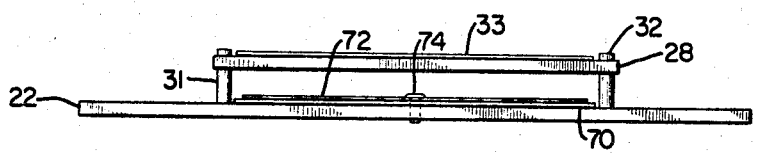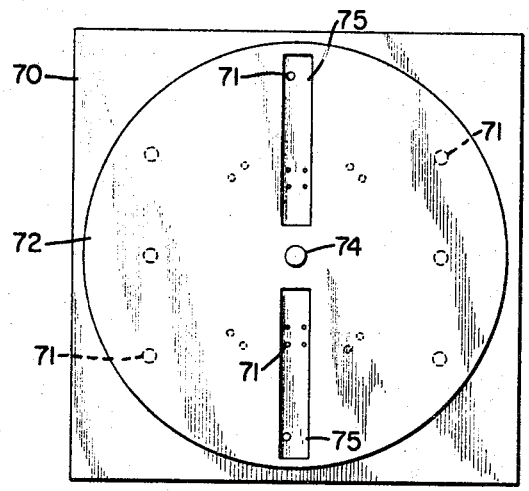

3,416,857
METHOD AND APPARATUS FOR EXAMINING
VISUAL FIELDS INCORPORATING OPTICAL
LIGHT TARGET PROJECTION MEANS AND
TRANSPARENT OVERLAY RECORD CHART
Robert E. Lookabaugh, P.O. Box 267,
Lincoln, Nebr. 68501
Filed May 29, 1963, Ser. No. 284,142
14 Claims. (Cl. 351—31)

This invention relates to a new and useful method and apparatus for determining and plotting the field of vision of the human eye and from which visual defects can be accurately determined and analyzed in a rapid and dependable manner.

Numerous techniques and instrumentation have been devised for charting defects in the visual field system. From these tests, it is possible to diagnose the cause of such defects, and for instance to diagnose various diseases of the eye and other parts of the body. In measuring visual fields, usually one eye is tested at a time, and the examiner records the patient's response either to movement of a target in or out of the field of vision or to a target flashed in the form of a series of different patterns or colors, while the patient's eye is directed at a central fixation point. Customarily the target is presented in the form of a test object which is either advanced across, or selectively exposed on, a screen for direct closeup viewing by the patient; also, it has been proposed to project the test objects for viewing on a screen by the patient at some distance from the patient and the object source. Generally, however, presently available techniques and devices are quite limited in use, and very often complex and difficult for a single operator to operate while accurately recording the test results. Recording procedures in particular have presented difficulties either from the standpoint of expense or accuracy in plotting. Furthermore, human or mechanical error is often involved in transferring findings from an instrument to the record form.

Accordingly, it is highly desirable to make available apparatus and techniques which are simplified and readily conformable for use by a single examiner in conducting various different tests for the purpose of determining the extent of the field of vision. Specifically, the present invention is adapted for use in accurately measuring and recording the patient's response either to variations in position, form, motion, or color of a light target projected for viewing at some distance from the patient's eye and in such a way that the light target formed for projection is simultaneously passed through a record form to provide a visual indication to the examiner of the location and character of the target being projected for viewing. The record form is further so positioned in relation to the screen that the examiner can mark the passage of the light target through the form to plot the patient's visual field while at the same time being in a position to observe the patient and to manipulate and control the light target presented. As a result, the present invention is very useful as an aid in charting defects of the blind spot, optic nerve, papillo-macular nerve bundle, and central and peripheral scotomas; and is further useful in plotting defects resulting from such disorders as glaucoma, malingering, hysteria, exhaustion, toxemias, optic nerve atrophy, papillitis, lesions of the optic tract and primary optic centers manifested by hemianopsias, along with many field changes that occur from retinopathies, amblyopias and aphasias.

It is therefore a primary object of the present invention to provide for a method and apparatus useful in conducting eye examinations especially having to do with measurement of visual fields which are simplified, versatile and accurate; moreover, which can be carried out by a single examiner in such a way as to permit quick and accurate testing, recording and analysis.

It is another object of the present invention to provide for related interchangeable techniques utilizing a single instrument in examining visual fields in which a single examiner can progress through a series of tests quickly and smoothly, while simultaneously plotting the visual field and observing the patient throughout the test series.

It is a further object to provide for a unique way of projecting and advancing a concentrated light target across a viewing area and wherein the target can be modified in form, size or color according to the test being conducted; further to provide for rapid and accurate recording by the examiner of the patient's response to the target projected without the use of special recording systems, and with the target projected being under the complete and direct control of the examiner at all times.

It is a further object of the present invention to provide in visual field examinations for a novel method and means of concentrating and controlling the passage of light through one or more openings for projection in the form of a luminous target on a viewing surface, of advancing or flashing the target on the viewing surface, and of accurately recording patient response to each target presented for viewing; furthermore, to provide in a method and means of the character described for a record chart positioned across the light path so as to accurately simulate each target projected on the viewing surface and to permit accurate plotting thereon without obstructing the patient's vision or otherwise interfering with the test; and in addition, whereby the completed record form alone may be projected onto the viewing surface for comparison and analysis.

It is a still further object of the present invention to provide for a novel and improved device for front or rear projection of a light target on a viewing surface at a predetermined distance from the patient's eye and which is capable of smooth and rapid advancement of the target along with modification in form or size without altering the position of the patient or examiner.

It is an additional object of the present invention to make provision for a device for successively projecting a series of light targets on a viewing surface, which targets are easily variable in form and location as well as size and color while being easily interchangeable in making such variations and while permitting accurate recording and observation by the examiner.

The above and other objects, advantages and features of the present invention will become more readily understood and appreciated from a consideration of the following detailed description of alternate forms of the present invention taken together with the accompanying drawings, in which:

FIGURE 1 is a perspective view illustrating the relative disposition between a projection apparatus, viewing screen, and a patient, in accordance with the present invention.

FIGURES 2 and 3 are plan views of one form of light control device and recorder useful in testing the central and peripheral field of vision and illustrating the relative movement between parts in advancing the target on the screen from one location to another, in accordance with the present invention.

FIGURE 4 is a sectional view taken on lines 4—4 of FIGURE 2.

FIGURES 8 to 10 show test cards adapted for use in conjunction with the projection apparatus shown in FIGURE 1 for flashed projection of targets in various forms on the viewing screen.

FIGURE 11 is a front view of still another form of light control device for flashed projection of targets on a viewing screen with the record form being positioned in stationary relation on the device; and, FIGURE 12 is a plan view of the test device shown in FIGURE 11.

Figure 3:
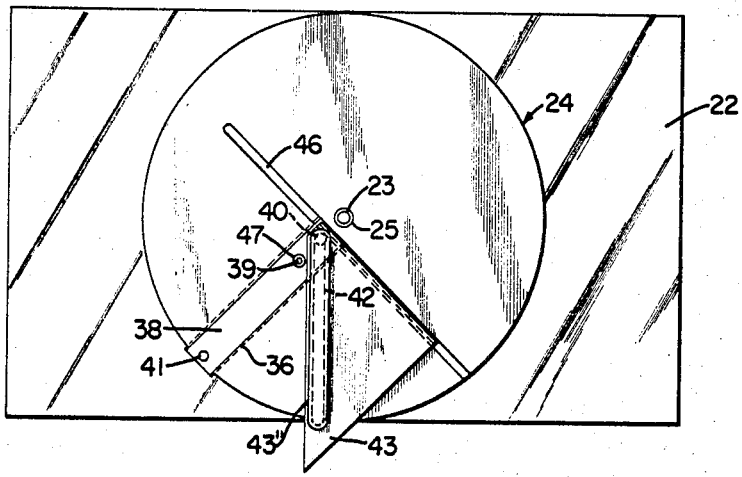

As a setting for the present invention, a conventional light projector 10 is shown for projecting light upon a vertical viewing screen 12. The projection apparatus shown is the Thermofax Overhead Projection Unit manufactured by Minnesota Mining and Manufacturing Co. and is merely representative of a number of commercially available projection units which may be suitably employed to carry out visual field examinations according to the present invention. In the apparatus shown, a housing 13 is positioned on a stand S and encloses a light source, not shown, which is reflected upwardly through a condensing lens extending across the top rectangular frame portion 14 of the housing. A lens system 15 is centered over the lower housing 13 by means of an angularly extending post 16, and the lens system includes a lower collecting lens 17, a reflecting mirror and magnifying lens not shown for the purpose of projecting the light pattern formed onto the viewing screen 12. The patient represented at P is most desirably situated alongside the projector unit in facing relation to the screen 12 and the examiner may take a position on the opposite side or just forwardly of the projector unit so as to be able to observe the patient during the tests as well as to perform the recording operation to be described.

In accordance with the present invention, and as shown in FIGURES 1 to 4, a light control assembly 20 is positioned on the top surface 14 of the projector unit. The device 20 is comprised of a transparent base 22 having a hollow center post 23, and a plate or disk 24 includes a central opening 25 and bushing therein for mounting of the disk in journaled relation on the post 23. An upper transparent supporting plate 28 is of generally rectangular configuration and has openings 29 and 30 in opposite corners for disposition on a pivot pin 31 and corner post 32, respectively, extending upwardly from diagnoally opposed corners of the base. In connected relation the plate is centered over the disk 24 to serve as a supporting surface for a transparent record sheet 33. To permit positioning and removal of the disk 24 relative to the center post, the plate 28 can be displaced or lifted slightly so that the one corner having the opening 30 can be lifted off of the pin 32 to permit pivotal displacement or movement of the plate 28 about the pivot pin 31 to an out-of-the-way position. In this way, the disk 24 is easily accessible without disassembling the entire unit. Also, by independently supporting the disk 24 and record chart 33 either can be individually positioned on the device without the other for projection on the screen.

Preferably, the disk 24 is constructed and arranged to control the projection of light upon the viewing screen 12 in the form of a central fixation point F and a moving luminous spot or target T. To this end, the disk 24 is preferably formed of a lower transparent lamination 34 and an upper opaque lamination 35. In this manner, light will pass through the center opening 25 in the form of a concentrated or point source of light for projection by the lens system 15 onto the screen as a central luminous spot defining the fixation point F. To define the moving target, the disk is additionally provided with a radial guide slot 36 formed through the thickness of the opaque lamination 35 so as to expose the transparent lamination and to permit passage of light therethrough. However, the passage of light is controlled by a slide 38 inserted in the slot 36, the slide having a limited opening 39 and upwardly projecting pins 40 and 41 at opposite ends thereof.

The innermost pin 41 is inserted for movement in a groove 42 formed along one side of a triangular cover plate 43, and a cover strip 43" is positioned in spaced relation over the groove to prevent the passage of light through the groove. In turn, a second side of the cover plate has a downwardly projecting lip 45 for insertion in a groove 46 of limited depth extending normal to the slot 36 and diametrically across the disk. The pin 40 serves merely as a handle or means for advancing the slide and it will be noted that as the slide is moved outwardly along the slot from the position illustrated in FIGURE 3 to the position illustrated in FIGURE 4, the cover plate will be caused to move across the open space formed between the inner end of the slide and the innermost end of the slot so as to cover the gap therebetween. Light is therefore projected only through the openings 25 and 39 since the disk itself is opaque and the cover plate will cover any space formed between the slide and the slot as the slide is advanced through its various degrees of movement.

Figure 6:
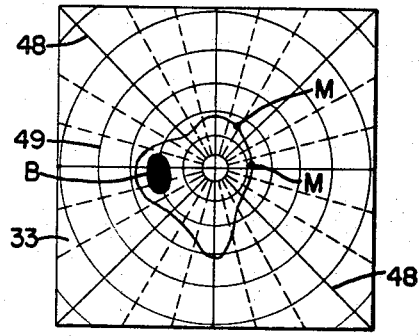
FIGURES 6 and 7 illustrate typical record forms used in the present invention with representative test results being indicated thereon.
Figure 7:
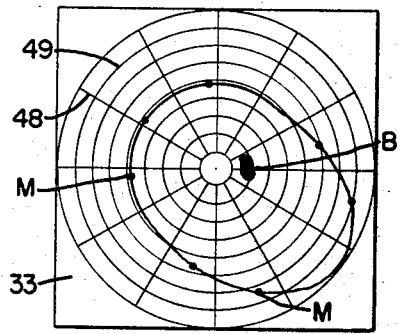

Typical record charts 33 are illustrated in FIGURES 6 and 7 and for example each record chart may be suitably composed of a thin transparent plastic sheet material which will not interfere with the passage of light from the openings 25 and 39 in the disk to the lens system for projection on the viewing screen. As an important feature of the present invention, passage of the two point sources of light through the record chart will accurately simulate thereon the relative position of the targets or spots on the screen so that the examiner is provided with an accurate indication of the relative location of the target and can therefore remain in a position somewhat facing the patient while at the same time manipulating the slide to control advancement of the target across the record chart 32 and the screen 12. Preferably, the record chart, in accord with conventional practice, has a series of spaced radial lines 48 forming latitude markings and spaced concentric circles 49 which define meridian markings on the chart. For most field tests, one eye is tested at a time and for this purpose either an opaque disk or reading card can be held by the patient while the field of the other eye is being taken, although for more comprehensive studies a tie or patch is recommended. The patient is usually positioned so that the eyes are in the same vertical plane as the lens system, once the projector unit is positioned in proper relation to the screen; of course, variations in the distance of the projector unit from the screen and the patient from the screen can produce variations in angular target size. Also, target sizes can be varied by the use of a hollow insert 47 positioned in the opening 39 to reduce the size of the opening according to the target size to be projected for a given distance between the projector and screen.

In charting the blind spot, the record form is first placed on the supporting plate 28, the slide 38 is pushed in toward the center of the disk and the opening 39 covered so that when the instrument light is turned on the light is projected only through the center opening to form the fixation point F. The fixation point is first centered in relation to the screen simply by moving the entire unit and stand relative to the screen, and also this can be used as a guide in determining the desired distance of the unit from the screen. When the opening 39 is uncovered, light passing therethrough will be projected by the lens system 15 in the form of a luminous spot or target T on the screen. Standard procedures can be followed in field charting of the blind spots from visible to invisible or vice versa with the examiner marking the record form directly on the top of the target light as it is projected therethrough. For example, the chart would be marked to indicate either the point of disappearance or of appearance of the target light into the field of vision at spaced circumferential intervals utnil a complete outline of the blind area for the one eye is obtained. Straightline motion of the target on the screen is accomplished by sliding the slide 38 along the slot, whereas vertical and oblique motion of the target can be obtained by manually rotating the entire disk and slide about the center post. In order to clear the corner post 31 it will be necessary to push the slide 38 in and rotate it past the post.

To chart each eye, a separate record form may be positioned in place, so that each will contain a blind spot B depending upon which eye is being tested. For example, the chart in FIGURE 6 would be representative of the left eye, and the chart in FIGURE 7 indicates the results for the right eye. Essentially, the same procedure may be followed in charting the optic nerve, the Papillo-Macular Nerve Bundle, central fields out to 25°, Bjerrum's and Siedels sign, the majority of the toxemias, scotomas, and hemianopsias; and for instance, the markings M as outlined in FIGURES 6 and 7 would be typical of the results obtained on the record forms. If desired the completed record forms may then be projected on the screen by removing the disk assembly, and passing the light directly through the record form.

For the different tests, the target size may be changed, both room and target illumination may be varied, or the position of the patient in relation to the instrument or screen may be varied as described. Similarly, color fields may be tested using standard procedures and inserting colored filter inserts, as would be represented by insert 47, over the opening 39 on the slide attachment. Most desirably, the results are recorded by using pencils of the same color as the target used to indicate the extent of the color field of the patient. Form and motion fields can be charted using the instrumentation shown in FIGURES 1 to 4, preferably with the patient being seated between the instrument and the screen to reduce the size of the target projected. Field tests for malingering, fatigue, hysteria, scotamata outside of 25°, or any other field effect beyond 25° can also be determined suing a combination of procedures as outlined and in accordance with conventional techniques.

Figure 5:
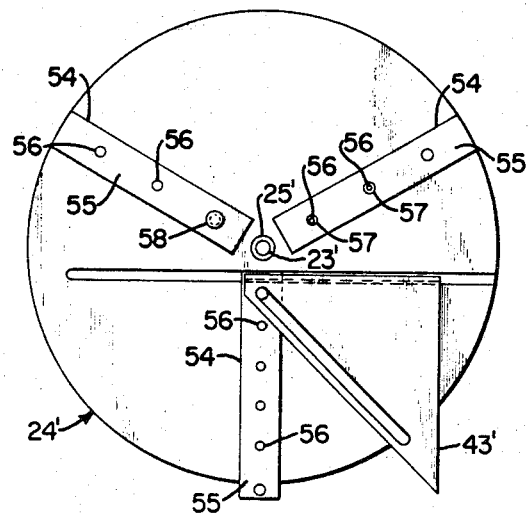
FIGURE 5 is a plan view of a modified form of light control device useful in form, motion, and color field testing.

Another form of the present invention is illustrated in FIGURE 5 wherein a modified rotating disk 24' again has a center opening 25' for disposition over the center post 23', as shown in FIGURES 2 to 4, and with a record form 33 being superimposed over the disk. For the purpose of carrying out tachistoscopic screening work, the disk is modified by having slots 54 at equal spaced intervals, and bar-shaped plates 55 are positioned in each of the slots 54, each plate having a series of spaced openings 56 of graduated size therein. In this relation, inserts 57 may be positioned in selected openings 56 to vary the size thereof; or, selected openings may be completed covered by disks 58 so as to form different target patterns on the screen; or, inserts in the form of different colored filters may be placed in the openings for tachistoscopic color field testing. According to the target pattern selected, and with the disk properly positioned in relation to the record chart, the particular target pattern either in the form of colors, or other visual stimuli are exposed for a limited time interval usually on the order of a fifth of a second or less. This is accomplished by use of a shutter attachment 59 positioned over the front of the lens system and which can be actuated by the examiner to flash the target pattern on the screen. The patient then indicates what is seen on the screen and the examiner is able to mark the record chart to correspond with the visual response of the patient to the presentation on the screen, since the record form is illuminated by the light pattern before and after the test. In carrying out each test, with the patient positioned in desired relation to the screen, the flash attachment or shutter is moved into position and the instrument turned on with the shutter closed. In this test, the fixation point F is marked on the screen using a luminous marker, not shown, which is positioned over the fixation point from the center opening 25', after which the opening 25' is covered with the opaque disk 50. The remaining exposed openings will form a target pattern which may be flashed first in any meridian, then advanced for successive flashing at a series of different angles until a 360° circle has been completed. The test is then repeated for the other eye, the patient using any conventional means to cover the eye not being screened. If an exposed target point is missed or not observed in any meridian, then the test should be repeated and if missed again is marked on the record form.

FIGURES 8 to 10 illustrate still another modified form of device useful in tachistoscopic testing for visual fields. Here, a series of cards 62, 63, and 64, respectively, are employed each having a different pattern of limited openings therein, such as circular openings 65 and 66. The arrangement shown in FIGURE 2 is used except that the rotating disk assembly is removed and most desirably each of the cards are placed in succession directly over the record chart so that the light passes first through the transparent record form, then through the openings 65 and 66 on the cards. Again, the fixation is formed by placing a luminous marker at the central point F on the screen. As each card pattern is flashed in succession on the screen, the examiner can record the patient's response by marking through the openings on the card directly on the record form to indicate any openings not seen by the patient. As before, one eye is tested at a time until a complete record is obtained of the patient's response to the various different target patterns. The cards shown in FIGURES 8 to 10 are merely representative of various patterns that can be used but again illustrate the versatility of the technique and where the record form will again accurately simulate the location of the openings on the screen so that the examiner can concentrate his attention on the cards and the patient to accurately mark the responses of the patient to each test card.

FIGURES 11 and 12 are illustrative of the same type of test in which a succession of target patterns are to be projected onto the screen for testing the patient's response thereto, again using the projector unit and the device 20 illustrated in FIGURES 2 to 4. However, in place of the rotating disk assembly 24, an opaque plate or disk 70 is utilized having a series of openings 71 forming different patterns in the several quadrants of the field of vision. An opaque disk 72 is superimposed in centered relation over the plate 70 by means of a connecting pin 74 positioned within the outer post 23, the disk 72 being free to rotate with respect to the plate 70. The disk member is provided with opposite radial slots 75 to selectively expose various different patterns formed by the openings 71. Thus, the light will pass through only the openings exposed by the disk 75 to form a selected pattern on the record form 33 and the viewing screen. It will be obvious that one or more slots may be employed to accomplish the same end depending upon the particular type of pattern to be flashed on the screen, or the radial slots may assume other forms, such as, rounded, rectangular or oblong as illustrated.

In conducting tests, again the fixation point is marked directly on the screen using a luminous marker; then the target patterns as defined by the openings 71 are selectively exposed by rotating the disk 72 to different angular positions to form the desired target pattern, and each pattern is flashed on the screen in succession. Usually when any exposed target is missed, the test is repeated in that meridian and the particular openings missed are marked on the record form which, in this instance, is positioned over the disk assembly.

From the foregoing, it will be seen that the visual field of a patient can be quickly and accurately examined by directing a light source through one or more limited openings in an opaque member for projection onto a viewing surface in the form of a concentrated light target. By placing a light transmitting record form in the light path, the target or target pattern will be accurately simulated on the recording surface whereby it can be marked to indicate the visual response of the patient to the corresponding light target presented on the screen. In carrying out differential visual field tests, most desirably a number of different light targets are projected in succession for viewing, followed by selectively marking on the record form the location of the different light targets to indicate the visual response to each corresponding target presented, and specifically by selectively marking only the location of each light target not visible to the patient. In presenting various different light targets for viewing, the light target may be constantly illuminated and advanced across the viewing surface both in radial and rotational directions to accurately plot the field of vision; or a series of different light targets may be selectively exposed for a limited time interval as in tachistoscopic screening work. In either variation of the method, however, it will be noted that the target exposed for viewing is exactly simulated on the record form so that the examiner can mark the position of the light target on the record form and eliminate any possible error in transferring results from the screen to the record chart.

To further illustrate the versatility of the apparatus described, the luminosity of brightness of the fixation point and targets can be regulated by using neutral light filtering again in the form of filter inserts 47. Furthermore, the light targets may be polarized and be visible either to the left or right eye by having the patient wear polarized glasses. Thus, the central fixation point may be nonpolarized and the test targets polarized to permit binocular fixation of the fixation point and monocular response to the test targets presented on the screen. The techniques and apparatus of the present invention are ideally suited for rear projection testing; or in other words, projecting the light targets through a transparent viewing screen with the patient being situated on the opposite side of the screen and would be advantageous in outer peripheral field testing. Of added importance, the light control devices shown and described can be inexpensively manufactured and assembled and are light-weight for ease of manipulation in use.

It is therefore to be understood from the foregoing that various modifications and changes may be made in the apparatus and techniques adapted in following the principles of the present invention without departing from the spirit and scope thereof as defined by the appended claims.

What is claimed is:

1. A method for examining the visual field of the human eye comprising the steps of directing a light source through at least one limited opening to form a predetermined light pattern, optically projecting the light pattern formed onto a viewing surface, and placing a light transmitting record surface in adjacent and superimposed relationship to the limited opening in the path of light to simulate on the record surface the location of the light pattern projected for viewing, advancing the light pattern transversely to the record surface and the viewing surface with the eye in fixed relation to a point on the viewing surface, followed by marking the record surface to indicate visual response to each corresponding light pattern presented on the viewing surface.

2. The method for examining the visual field of the human eye according to claim 1 being further characterized by flashing each selected light pattern in succession on the viewing surface for a limited time interval.

3. The method for examining the visual field of a patient according to claim 1 including the additional steps of successively covering different selected openings to permit passage of the light source only through the exposed openings whereby to form different selected light patterns on the viewing surface, and of marking on the record surface the location of those portions of the light pattern passing through the record surface not visible to the patient when presented on the viewing surface.

4. The method according to claim 1 being further characterized by controlling the exposure of each light pattern for flashing on the viewing surface after passage through the record surface so that each successive light pattern remains under illumination on the record surface before and after flashing of the light pattern on the viewing surface.

5. Apparatus for examining the visual field of a human eye comprising a viewing screen having a central fixation point thereon, a light source, optical light projecting means for projecting light from the light source upon the viewing screen, an opaque plate member positioned transversely across the path of light from said light source, said plate member having a slide insert positioned for movement in a radial slot therein with a limited opening in said slide advancing with said slide whereby light is selectively passed through the limited opening in the form of a concentrated light target for projection upon the viewing screen, a cover plate operatively connected to said slide and said plate member for selectively covering the space formed between said slide and the slot according to the relative disposition of said slide in the slot, means for rotating said plate member, slide and cover plate as a unit to rotationally advance the concentrated light target formed across said viewing screen, and a transparent record chart positioned in stationary relation over said plate member and adjacent thereto for passage of the light from the limited opening therethrough whereby to provide a visual indication of the location of the light target projected upon said viewing screen and to enable marking of such location on said record chart.

6. In apparatus for examining the visual field of the human eye having a viewing screen, a light source and optical light projecting means for projecting light from the source upon said viewing screen, the combination therewith of a stationary opaque member and a rotatable opaque member disposed in adjacent superimposed relation to one another transversely across the path of light from said light source, one of said members including limited openings at selected intervals therein, and the other of said members being slotted to selectively expose the openings in the one member for projection of a selected light pattern on the viewing surface according to the series of opening exposed, and a transparent record chart positioned in stationary relation adjacent to and superimposed over said members for passage of each selected light pattern therethrough whereby to simulate on said record chart the light pattern projected upon said viewing screen and to enable marking of the light pattern location on said record chart.

7. An optical testing device comprising, a viewing surface, a light source disposed away from the viewing surface, light control means being centered in the path of light from the light source and having at least one limited opening therein to selectively pass light from the light source therethrough, optical means for projecting the light passing through the limited opening upon the viewing surface in the form of a light target, said light control means being movable to advance the limited opening across the light path and to vary the location of the light target upon the viewing surface, a stationary transparent record chart, and means supporting said record chart and said light control means in adjacent, superimposed relation to one another transversely across the path of light from the light source to simulate on said record chart the location of the projected light target on the viewing surface and to enable marking of such location on said record chart.

8. An optical testing device according to claim 7, said light control means further being provided with a central opening therein being fixed in relation to the limited opening to selectively pass light from said light source for simultaneous projection of the fixed central opening and the movable limited opening on the viewing surface.

9. An optical testing device according to claim 7, said light control means being supported for rotation across the light path, and a movable slide in said light control means containing the limited opening for linear advancement of the limited opening across the light path.

10. An optical testing device according to claim 7, said supporting means for said light control means and said record chart being further characterized by independently and removably supporting said light control means and said record chart in spaced parallel relation to one another, said light control means being mounted for rotation across the light path and said record chart being supported in a stationary relation to said light control means.

11. An optical testing device according to claim 7, said light control means being removably disposed over said record chart for selective marking of said record chart through the opening in said light control means.

12. An optical testing device according to claim 7, said light control means being defined by an opaque plate member including a slide attachment movable in a radial slot in said plate member, said slide attachment containing the movable opening for radial movement of the opening with respect to said plate member, and a cover plate operatively connected to said plate member and said slide and being responsive to movement of said slide for selectively covering the space formed between said slide and said radial slot.

13. In optical testing apparatus having a vertically disposed viewing surface, an upwardly directed light source positioned away from the viewing surface and optical projecting means for projecting light from the light source in a horizontal direction upon said viewing surface, the combination therewith of a horizontally disposed light control unit including an opaque plate member having a slide movable in a radial slot in said plate member with a limited opening being formed in said slide for radial movement with respect to said plate member, a cover plate operatively connected to said slide and said plate member for selectively covering the space formed between said slide and said slot and supporting means mounting said opaque plate member for rotation in transverse centered relation across the path of light from said light source whereby light passing through the opening in said slide forms a concentrated light target for projection by said projecting means upon said viewing surface and a transparent record chart positioned in stationary relation adjacent to and over said plate member for passage of the light from the limited opening therethrough whereby to provide a visual indication of the location of the light target projected upon said viewing surface and to enable marking of such location on said record chart.

14. In an optical testing apparatus according to claim 13, said opaque plate member being mounted for rotation on said supporting means, and said supporting means and plate member including a central opening fixed with respect to said light source for projection of a central fixation point upon said viewing surface.

References Cited

UNITED STATES PATENTS

| | | | |
|---|---|---|---|
| 886,772 | 5/1908 | Dodge | 351—17 |
| 1,698,013 | 1/1929 | DeZeng | 351—30 |
| 2,213,711 | 9/1940 | Lueck | 351—30 |
| 2,528,681 | 11/1950 | Berssenbrugge | 88—24 |
| 2,529,664 | 11/1950 | Roysher | 88—24 |
| 2,717,529 | 9/1955 | Alexander | 351—31 |
| 2,959,094 | 11/1960 | Kosma | 88—24 |

FOREIGN PATENTS

| | | |
|---|---|---|
| 337,788 | 11/1930 | Great Britain. |
| 876,928 | 8/1942 | France. |
| 1,313,468 | 11/1962 | France. |

DAVID H. RUBIN, *Primary Examiner.*

U.S. Cl. X.R.

351—23, 39; 88—24; 128—2